United States Patent
Mlinaric et al.

(10) Patent No.: US 11,585,247 B2
(45) Date of Patent: Feb. 21, 2023

(54) RECIRCULATING HYDRAULIC FLUID CONTROL VALVE

(71) Applicant: Schaeffler Technologies AG & Co. KG, Herzogenaurach (DE)

(72) Inventors: Andrew Mlinaric, Lakeshore (CA); Gustavo de Oliveira Figueiredo, Sterling Heights, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/341,548

(22) Filed: Jun. 8, 2021

(65) Prior Publication Data

US 2021/0388857 A1  Dec. 16, 2021

Related U.S. Application Data

(60) Provisional application No. 63/038,889, filed on Jun. 14, 2020.

(51) Int. Cl.
*F01L 1/34* (2006.01)
*F16K 11/07* (2006.01)
*F01L 1/344* (2006.01)
*F16K 31/06* (2006.01)

(52) U.S. Cl.
CPC ..... *F01L 1/3442* (2013.01); *F01L 2001/3443* (2013.01); *F01L 2001/34426* (2013.01); *F01L 2001/34433* (2013.01); *F16K 11/0716* (2013.01); *F16K 31/0613* (2013.01)

(58) Field of Classification Search
CPC ..... F16K 11/0716; F01L 1/3442; F01L 1/047; F01L 2001/34426; F01L 2001/3443
See application file for complete search history.

(56) References Cited

U.S. PATENT DOCUMENTS

| | | |
|---|---|---|
| 7,000,580 B1 | 2/2006 | Smith et al. |
| 7,950,361 B2 | 5/2011 | Takenaka |
| 8,522,733 B2 | 9/2013 | Hoppe et al. |
| 9,784,143 B2 | 10/2017 | Snyder et al. |
| 2009/0020718 A1 | 1/2009 | Stallmann |
| 2009/0107433 A1 | 4/2009 | Tanaka |
| 2012/0152195 A1 | 6/2012 | Schulze et al. |
| 2013/0206088 A1 | 8/2013 | Wigsten |
| 2014/0311333 A1 | 10/2014 | Hutzelmann et al. |
| 2015/0218977 A1 | 8/2015 | Hofmann et al. |
| 2017/0058726 A1 | 3/2017 | Smith et al. |
| 2017/0260882 A1* | 9/2017 | Brower .............. F16K 15/18 |
| 2018/0283229 A1* | 10/2018 | Stanhope .......... F01L 1/3442 |
| 2018/0363514 A1 | 12/2018 | Stanhope |

(Continued)

FOREIGN PATENT DOCUMENTS

| | | |
|---|---|---|
| CN | 110318836 A | 10/2019 |
| CN | 110318838 A | 10/2019 |

(Continued)

*Primary Examiner* — Kelsey E Cary

(57) ABSTRACT

A hydraulic fluid control valve (HFCV) configured to recirculate an exiting hydraulic fluid from a first hydraulic actuation chamber to a second hydraulic actuation chamber is provided. The HFCV includes a spring well that combines a hydraulic fluid received from a hydraulic fluid pressure source with a recirculated hydraulic fluid from the first hydraulic actuation chamber and delivers the combination to the second hydraulic actuation chamber.

19 Claims, 6 Drawing Sheets

(56) References Cited

U.S. PATENT DOCUMENTS

| | | |
|---|---|---|
| 2019/0107014 A1 | 4/2019 | Smith |
| 2019/0234244 A1 | 8/2019 | Hisaeda et al. |
| 2021/0215070 A1 | 7/2021 | Figueiredo et al. |

FOREIGN PATENT DOCUMENTS

| | | |
|---|---|---|
| CN | 110359976 A | 10/2019 |
| JP | 2019132265 A | 8/2019 |
| JP | 2020024018 A | 2/2020 |
| KR | 20060051714 A | 5/2006 |
| WO | 2020008626 A1 | 1/2020 |

\* cited by examiner

RECIRCULATING HYDRAULIC FLUID CONTROL VALVE

CROSS-REFERENCE TO RELATED APPLICATIONS

This application claims the benefit under 35 U.S.C. § 119(e) of U.S. Provisional Application No. 63/038,889 filed on Jun. 14, 2020, which application is incorporated herein by reference.

TECHNICAL FIELD

This disclosure is generally related to a hydraulic fluid control valve that can be applied to a hydraulically actuated component or system, including, but not limited to, a camshaft phaser or a cranktrain phaser for an internal combustion engine.

BACKGROUND

A hydraulic fluid control valve can manage delivery of pressurized hydraulic fluid to a hydraulically actuated component such as a camshaft phaser or a cranktrain phaser of an internal combustion engine. Pressurized hydraulic fluid in an internal combustion engine is provided by a hydraulic fluid pump that is fluidly connected to a reservoir or sump of hydraulic fluid. The size, and, thus, power requirement of the hydraulic fluid pump is dependent upon a total volume of pressurized fluid that is requested or consumed by the internal combustion engine and its associated hydraulic fluid systems. This requested or consumed hydraulic fluid can be reduced by recirculating and re-using at least some of the hydraulic fluid that is typically returned to the reservoir or sump after being utilized for actuation purposes within a hydraulically actuated component.

SUMMARY

An example embodiment of a hydraulic fluid control valve is provided that includes a valve housing and a spool. The valve housing has a first fluid port configured to be fluidly connected to a first hydraulic actuation chamber, and a second fluid port configured to be fluidly connected to a second hydraulic actuation chamber. A vent port can be arranged between the first and second fluid ports in a longitudinal direction of the valve housing. The first and second hydraulic actuation chambers are configured to receive and exit hydraulic fluid. The spool is disposed within a longitudinal bore of the valve housing. The spool has an outer annulus, a through-hole arranged in the outer annulus, a longitudinal bore forming an inner fluid chamber, and a one-way valve arranged within the inner fluid chamber. The one-way valve opens in a radially inward direction and fluidly connects the through-hole to the inner fluid chamber.

In a first axial position of the spool, the outer annulus is configured to: i) receive hydraulic fluid from the first hydraulic actuation chamber, and ii) deliver at least a portion of the hydraulic fluid from the first hydraulic actuation chamber to the second hydraulic actuation chamber via the through-hole, the one-way valve, and the inner fluid chamber.

In a second axial position of the spool, the outer annulus is configured to: i) receive hydraulic fluid from the second hydraulic actuation chamber, and ii) deliver at least a portion of the hydraulic fluid from the second hydraulic actuation chamber to the first hydraulic actuation chamber via the through-hole, the one-way valve, and the inner fluid chamber.

The valve housing is configured to receive inlet hydraulic fluid from a hydraulic fluid pressure source, the inlet hydraulic fluid axially entering an end of the longitudinal bore.

In an example embodiment, the hydraulic fluid control valve further comprises a bias spring that is configured to apply an axial biasing force to the spool. The bias spring is disposed within a spring well formed between the spool and the valve housing. In the first axial position of the spool, the spring well is configured to: i) receive the at least a portion of the hydraulic fluid from the first hydraulic actuation chamber, ii) receive inlet hydraulic fluid from a hydraulic fluid pressure source, and iii) deliver the at least a portion of the hydraulic fluid from the first hydraulic actuation chamber and the inlet hydraulic fluid to the second hydraulic action chamber. A first end of the spring well can be configured to receive the recirculating hydraulic fluid moving in a first axial direction and a second end of the spring well can be configured to receive the inlet hydraulic fluid moving in a second axial direction.

In an example embodiment, in the first axial position of the spool, the outer annulus is configured to deliver a remaining portion of the hydraulic fluid from the first hydraulic actuation chamber to a vent port arranged on the valve housing.

In an example embodiment, in the second axial position of the spool, the outer annulus is configured to deliver a remaining portion of the hydraulic fluid from the second hydraulic actuation chamber to the vent port arranged on the housing.

The outer annulus and the longitudinal bore of the valve housing form an annular fluid cavity, and the annular fluid cavity can be configured with the vent port and the through-hole.

In an example embodiment, in the first axial position of the spool, the valve housing and the spool define a first hydraulic fluid path extending from a first end of the longitudinal bore of the valve housing to the spring well, and a first recirculation hydraulic fluid path. The first hydraulic fluid path provides hydraulic fluid to the second hydraulic actuation chamber via the second radial fluid port of the valve housing. The first recirculation hydraulic fluid path extends, in successive order, from the outer annulus, through the through-hole, through the one-way valve, through a first portion of the inner fluid chamber, and to the spring well. The first recirculation hydraulic fluid path is configured to provide hydraulic fluid from the first hydraulic actuation chamber to the second hydraulic actuation chamber via the second radial fluid port of the valve housing.

In an example embodiment, in the first axial position of the spool, the valve housing and the spool define a first return hydraulic fluid path configured to: i) return hydraulic fluid from the first hydraulic actuation chamber to the outer annulus, and ii) split into two hydraulic fluid paths including the first recirculation hydraulic fluid path and a first venting hydraulic fluid path.

In an example embodiment, in the second axial position of the spool, the valve housing and spool define: i) a second inlet hydraulic fluid path extending from the first end of the longitudinal bore of the valve housing and to a through-opening arranged at an actuator end of the spool, and ii) a second recirculation hydraulic fluid path. The second inlet hydraulic fluid path is configured to provide hydraulic fluid to the first hydraulic actuation chamber via the first radial fluid port of the valve housing. The second recirculation hydraulic fluid path extends, in successive order, from the outer annulus, through the through-hole, through the one-way valve, through a second portion of the inner fluid chamber, and to the through-opening arranged at the actuator end of the spool. The second recirculation hydraulic fluid path is configured to provide hydraulic fluid from the second hydraulic actuation chamber to the first hydraulic actuation chamber via the first radial fluid port of the valve housing.

In an example embodiment, in the second axial position of the spool, the valve housing and spool define a second return hydraulic fluid path configured to: i) return hydraulic fluid from the second hydraulic actuation chamber to the outer annulus, and ii) split into two hydraulic fluid paths including the second hydraulic fluid path and a second venting hydraulic fluid path.

BRIEF DESCRIPTION OF THE DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

DETAILED DESCRIPTION OF THE EMBODIMENTS

Figure 1:
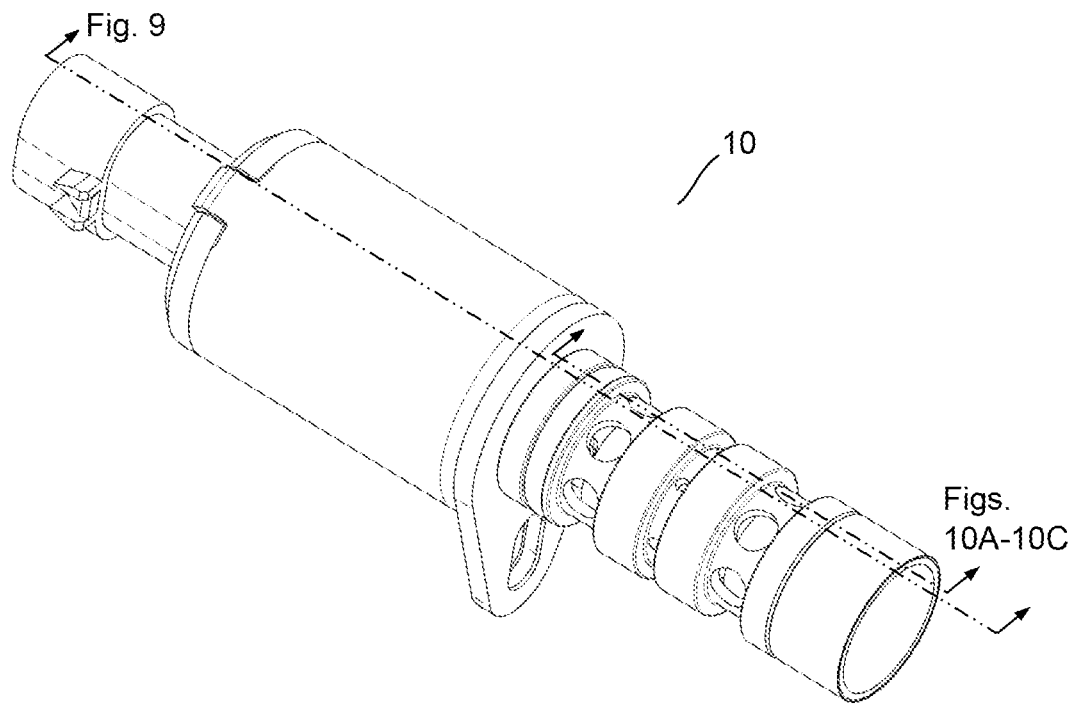
FIG. 1 is a perspective view of an example embodiment of a hydraulic fluid control valve (HFCV).

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis or a rotational axis. Radially refers to directions that are perpendicular to the central axis. The words "left", "right", "up", "upward", "upper", "down", "downward", and "lower" designate directions in the drawings to which reference is made. The terminology includes the words specifically noted above, derivatives thereof, and words of similar import.

Figure 2:
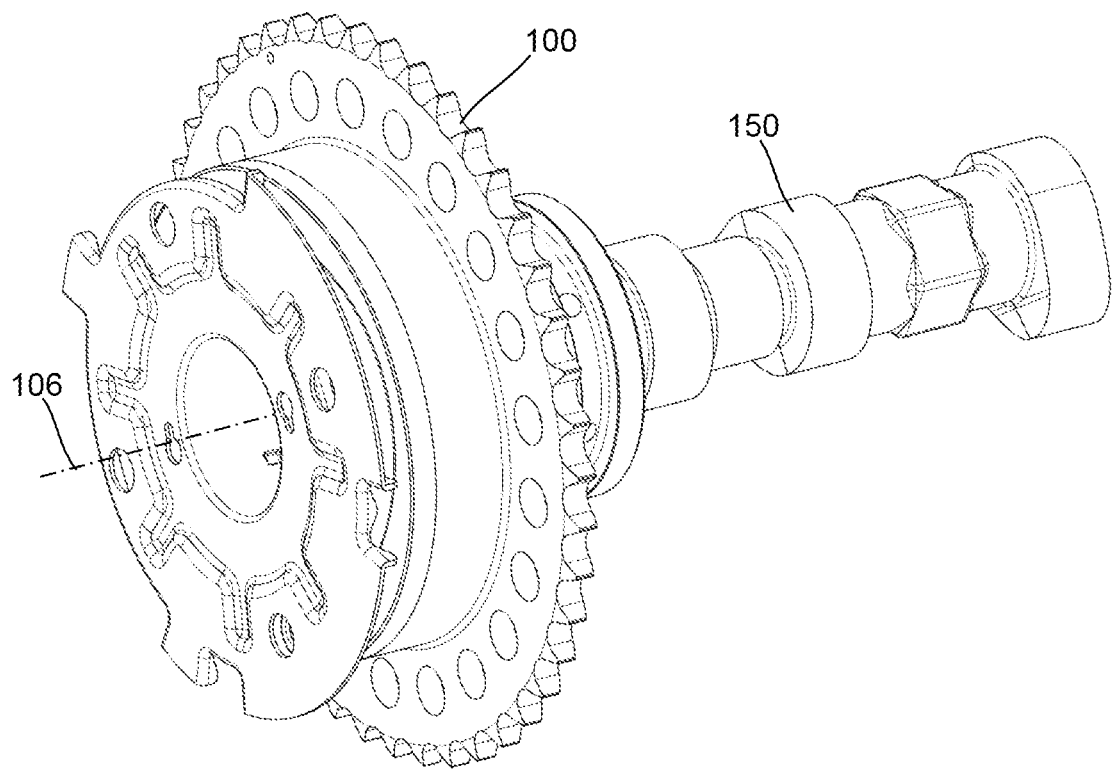
FIG. 2 is a perspective view of a camshaft phaser connected to a camshaft that can be utilized together with the HFCV of FIG. 1.
Figure 3:
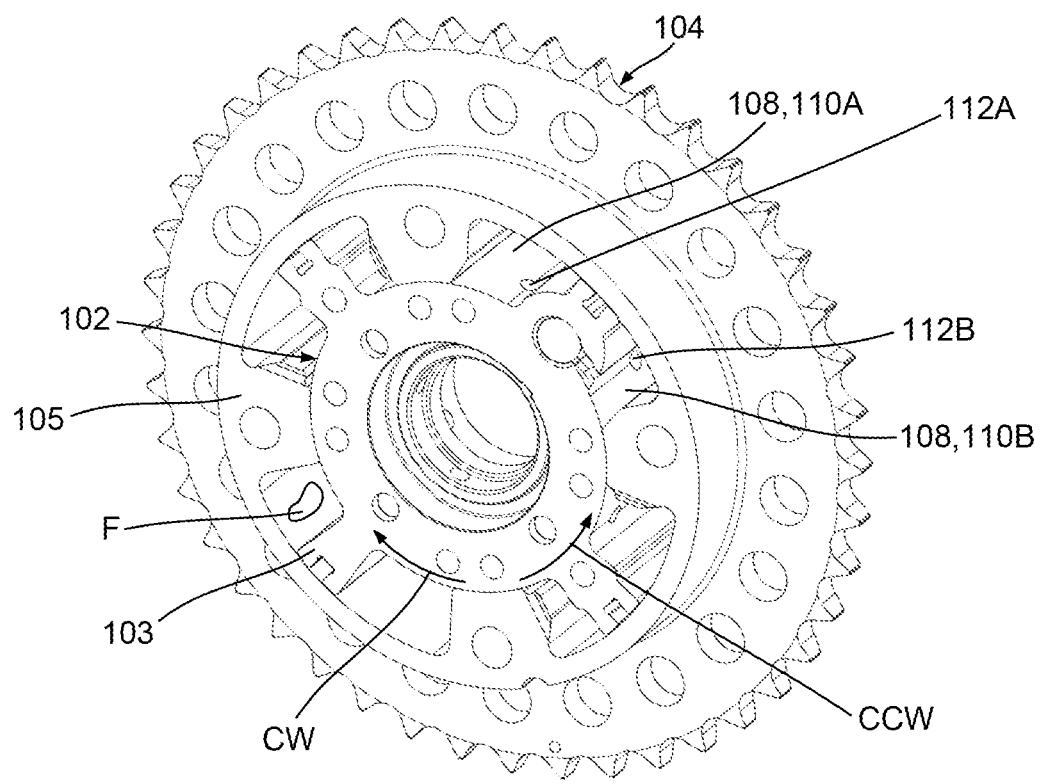
FIG. 3 is a perspective view of the camshaft phaser of FIG. 2 without end covers to show multiple hydraulic actuation chambers.
Figure 4:
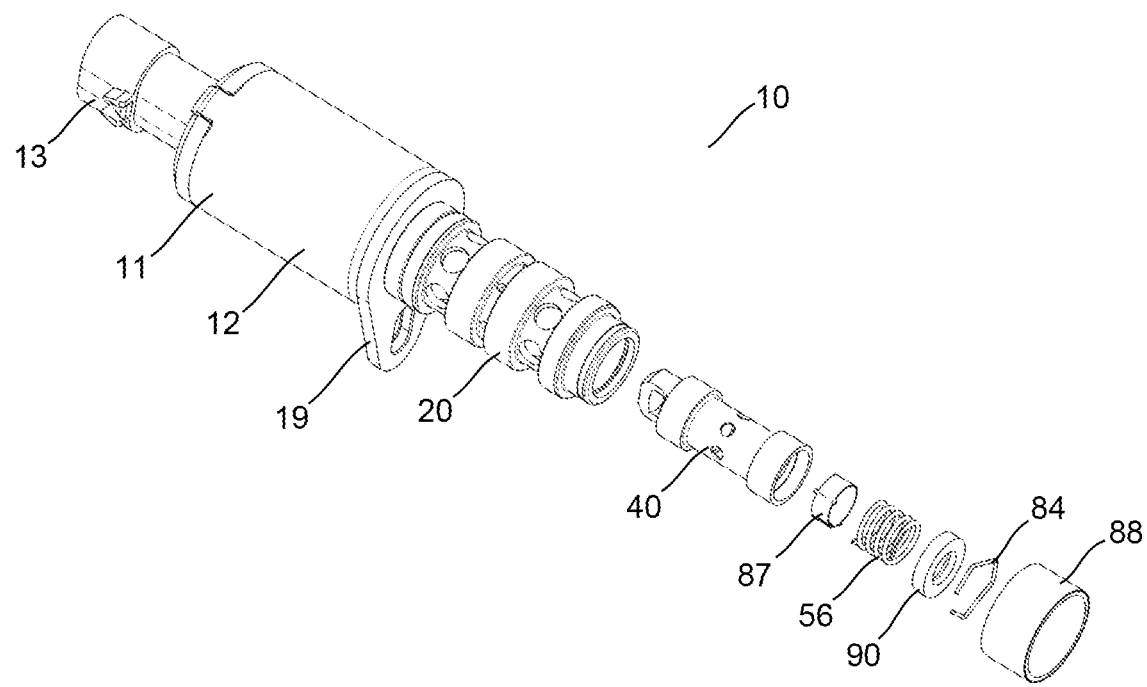
FIG. 4 is an exploded perspective view of the HFCV of FIG. 1 including a solenoid assembly, a valve housing, a spool, a spool one-way valve, a bias spring, and an inlet one-way valve assembly.
Figure 5:
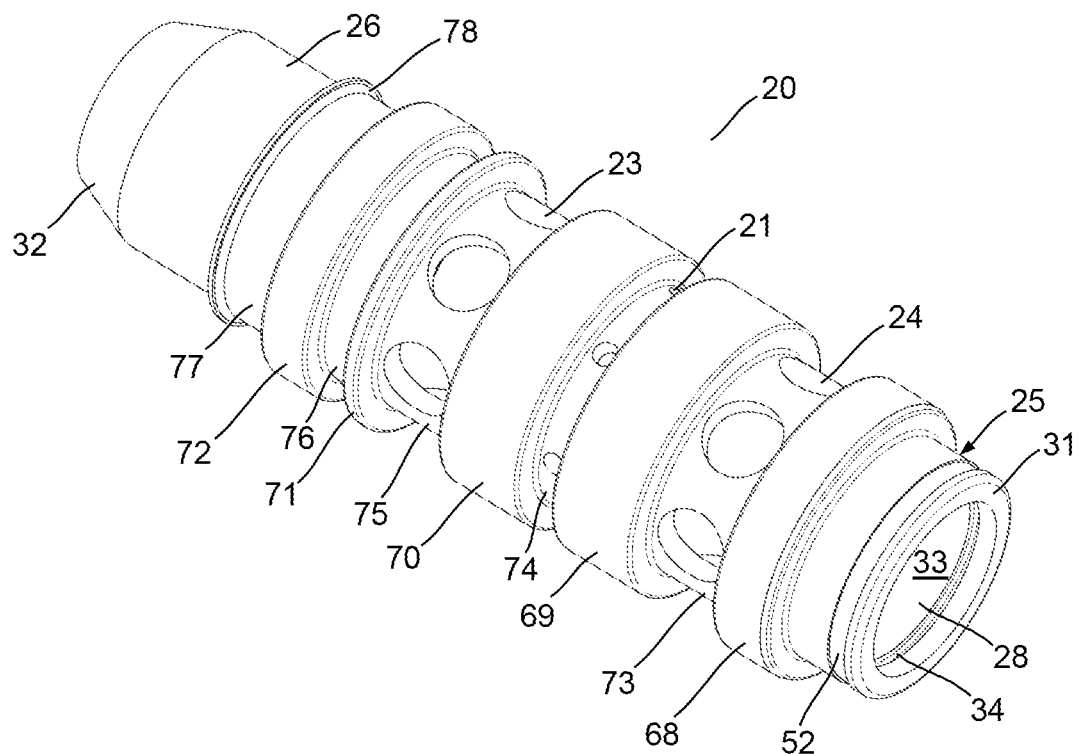
FIG. 5 is a perspective view of the valve housing of FIG. 4.
Figure 6:
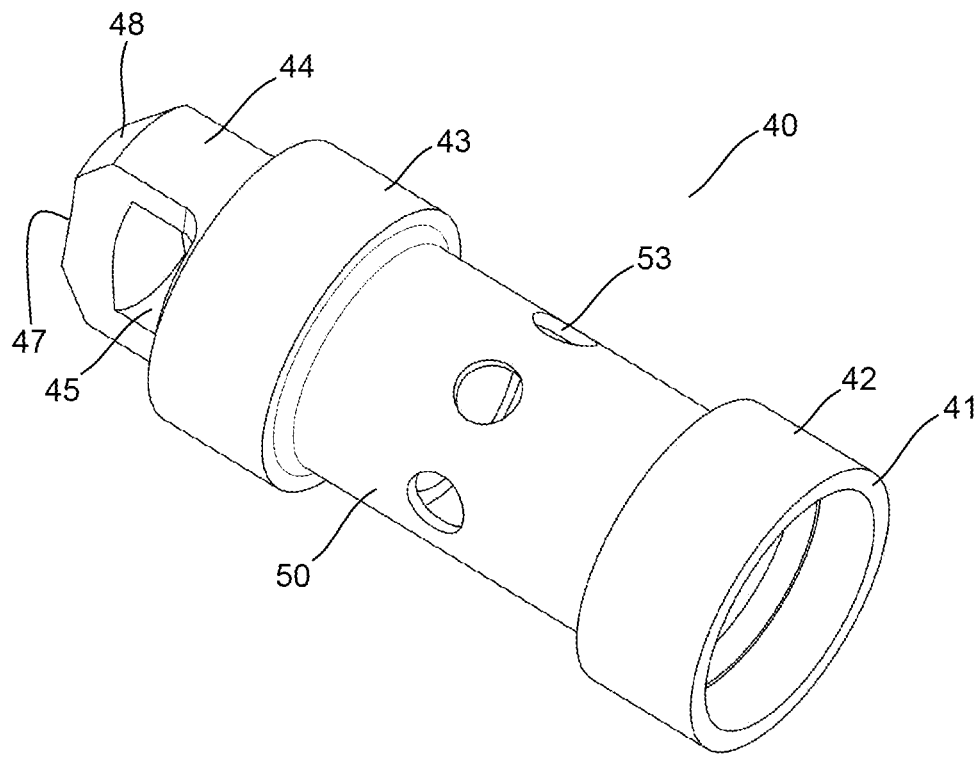
FIG. 6 is a perspective view of the spool of FIG. 4.
Figure 7:
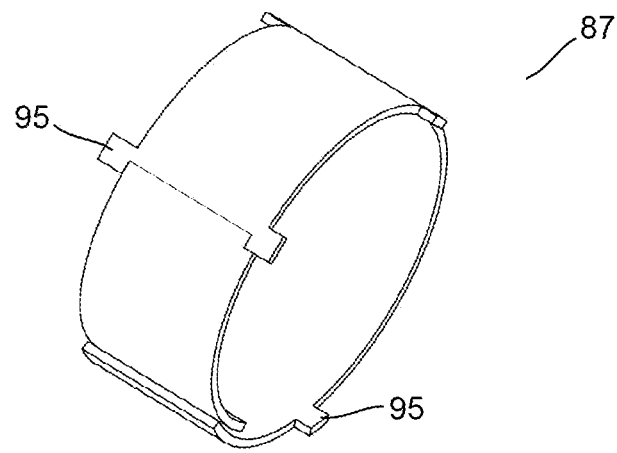
FIG. 7 is a perspective view of the spool one-way valve of FIG. 4.
Figure 8:
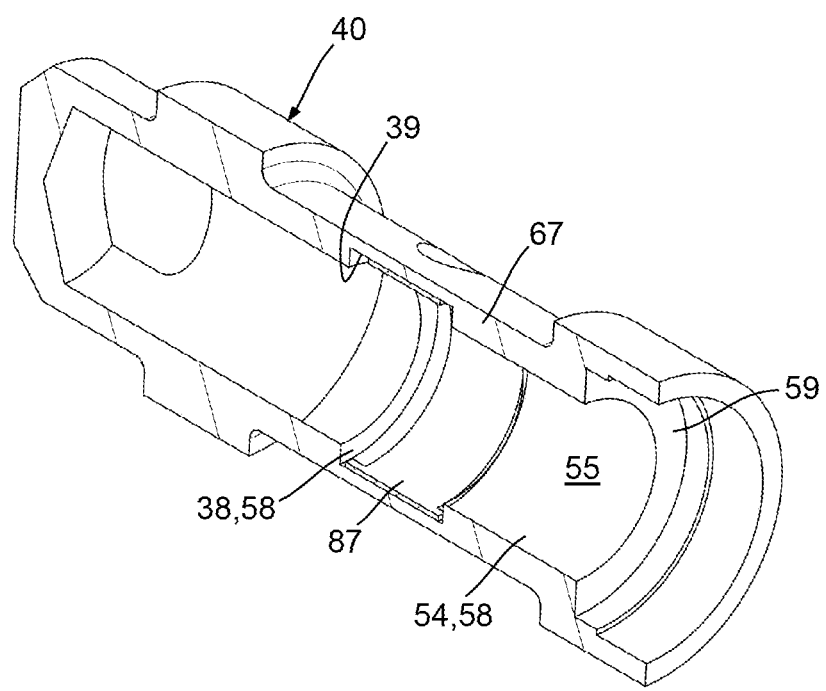
FIG. 8 is a perspective view of a cross-section of the spool and the spool one-way valve.
Figure 9:
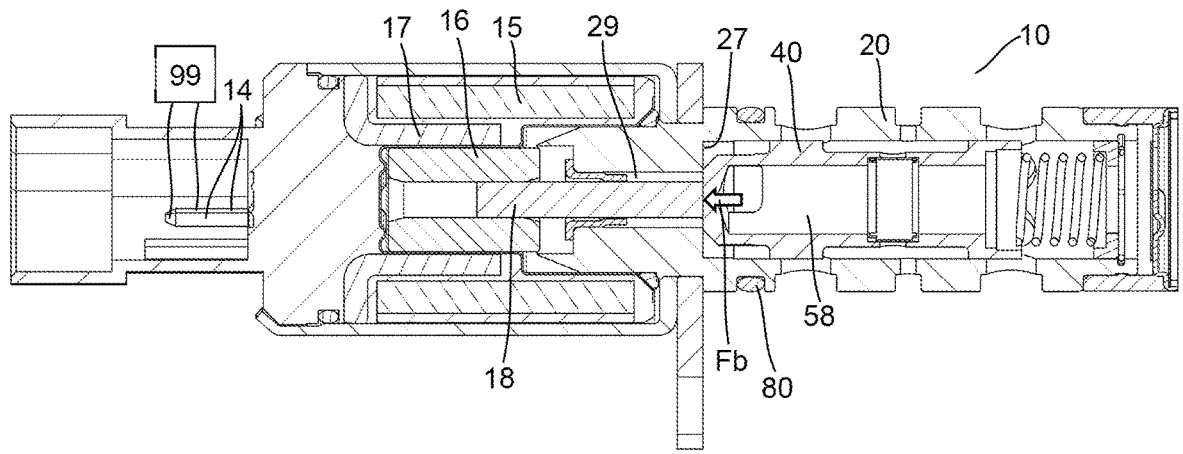
FIG. 9 is a cross-sectional view taken from FIG. 1 when the HFCV is in a de-energized state and the spool is in an extended position.
Figure 10A:
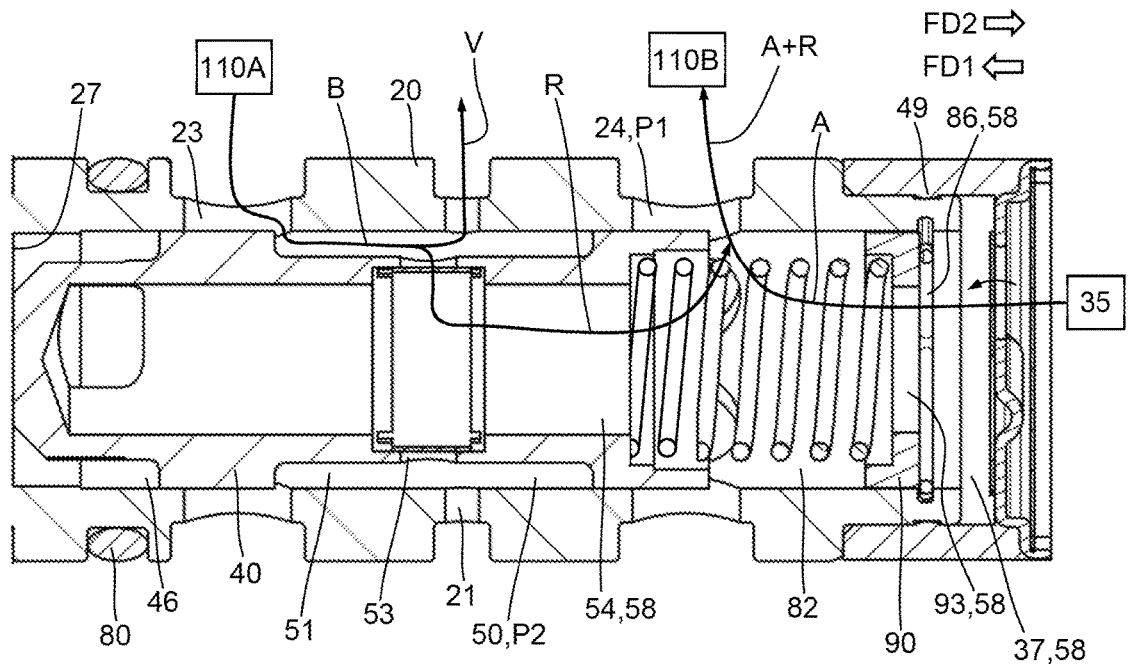
FIG. 10A is a partial cross-sectional view taken from FIG. 1 when the HFCV is in a de-energized state and the spool is in an extended position.
Figure 10B:
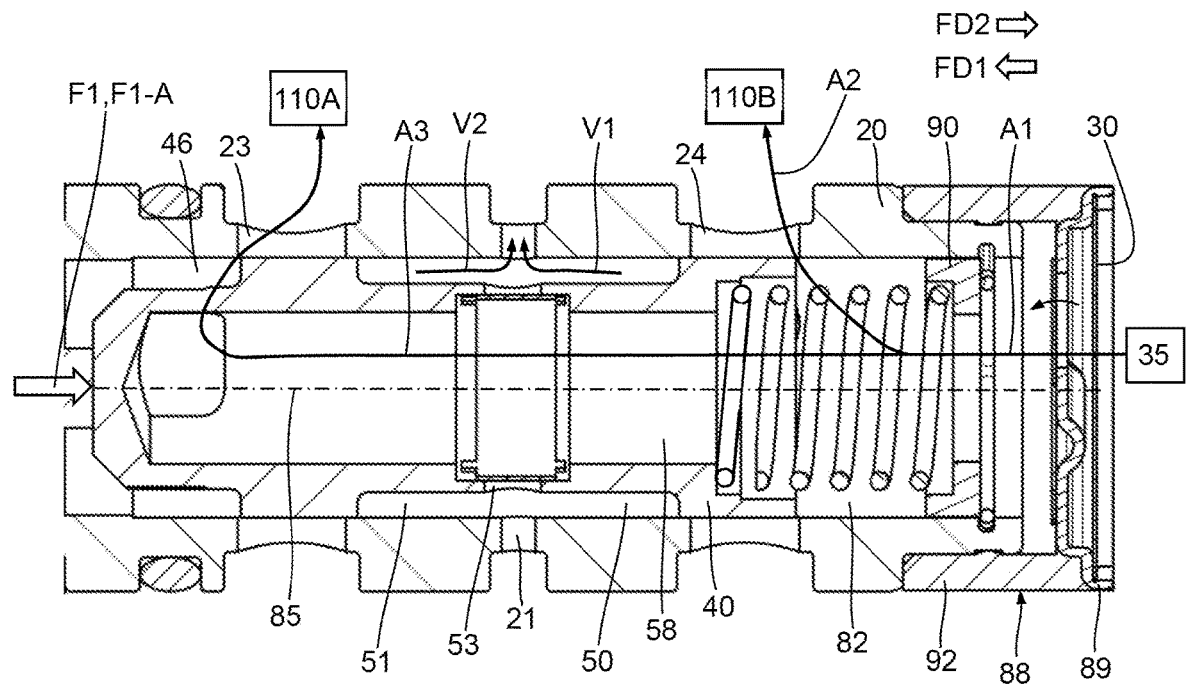
FIG. 10B is a partial cross-sectional view taken from FIG. 1 when the HFCV is in a first energized state and the spool is in a middle position.
Figure 10C:
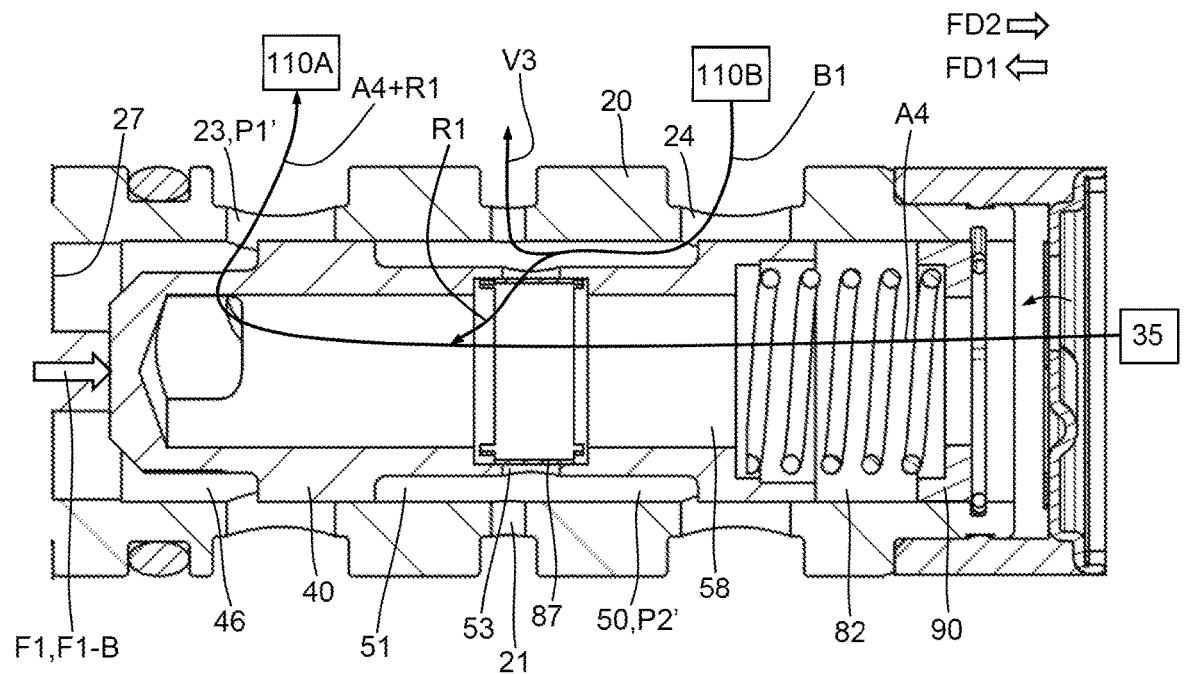
FIG. 10C is a partial cross-sectional view taken from FIG. 1 when the HFCV is in a second energized state and the spool is in a fully displaced position.

FIG. 1 is a perspective view of an example embodiment of a hydraulic fluid control valve 10 (HFCV). FIG. 2 is a perspective view of a camshaft phaser 100 attached to a camshaft 150 such that the camshaft phaser 100 is controlled by the HFCV 10 of FIG. 1 to phase the camshaft 150 relative to a crankshaft (not shown) of an internal combustion (IC) engine. FIG. 3 is a perspective view of a rotor 102 and a stator 104 of the camshaft phaser 100. FIG. 4 is an exploded perspective view of the HFCV 10 of FIG. 1 including a solenoid assembly 12, a valve housing 20, a spool 40, a spool one-way valve 87, a bias spring 56, and an inlet one-way valve assembly 88. FIG. 5 is a perspective view of the valve housing 20 of FIG. 4. FIG. 6 is a perspective view of the spool 40 of FIG. 4. FIG. 7 is a perspective view of the spool one-way valve 87 of FIG. 4. FIG. 8 is a perspective view of a cross-section of the spool 40 with the spool one-way valve 87 installed inside of the spool 40. FIG. 9 is a cross-sectional view taken from FIG. 1 when the HFCV 10 is in a de-energized state and the spool 40 is in an extended position. FIG. 10A is a partial cross-sectional view taken from FIG. 1 when the HFCV 10 is in the de-energized state and the spool 40 is in the extended position. FIG. 10B is a partial cross-sectional view taken from FIG. 1 when the HFCV 10 is in a first energized state and the spool 40 is in a middle position. FIG. 10C is a partial cross-sectional view taken from FIG. 1 when the HFCV 10 is in a second energized state and the spool 40 is in a fully displaced position. The following discussion should be read in light of FIGS. 1-10C.

The camshaft phaser 100 is hydraulically actuated by pressurized hydraulic fluid F that is controlled by the HFCV 10 to rotate the rotor 102 either clockwise CW or counterclockwise CCW about a rotational axis 106 relative to the stator 104 via hydraulic actuation chambers 108. The hydraulic actuation chambers 108 are formed via outwardly protruding vanes 103 of the rotor 102 and inwardly protruding lugs 105 of the stator 104. As the rotor 102 is connected to the camshaft 150, clockwise CW and counterclockwise CCW rotation of the rotor 102 relative to the stator 104 can advance or retard an engine valve event with respect to a four-stroke cycle of an IC engine. Clockwise CW rotation of the rotor 102 relative to the stator 104 can be achieved by: 1). pressurization of first hydraulic actuation chambers 110A via a first hydraulic fluid gallery 112A arranged in the rotor 102; and, 2). de-pressurization of second hydraulic actuation chambers 110B via a second hydraulic fluid gallery 112B arranged in the rotor 102 that fluidly connects the second hydraulic actuation chambers 110B to a vent passage via the HFCV 10 that returns the hydraulic fluid to "tank" or a sump. Likewise, counterclockwise CCW rotation of the rotor 102 relative to the stator 104 can be achieved by: 1). pressurization of the second hydraulic actuation chambers 110B via the second hydraulic fluid gallery 112B arranged in the rotor 102; and, 2). de-pressurization of the first hydraulic actuation chambers 110A via the first hydraulic fluid gallery 112A that fluidly connects the first hydraulic actuation chambers 110A to tank via the HFCV 10. The preceding pressurization and de-pressurization actions of the first and second hydraulic actuation chambers 110A, 110B can be accomplished by the HFCV 10. The HFCV 10 is fluidly connected to a hydraulic fluid pressure source 35 such as an oil pump and can communicate electronically via terminals 14 with a controller 99 such as an engine control unit (ECU) to control the camshaft phaser 100. Although the HFCV 10 is described as controlling the camshaft phaser 100, any phase adjustment mechanism such as that utilized for a variable compression ratio system could be controlled by the HFCV 10.

The HFCV 10 includes the solenoid assembly 12, a mounting plate 19, the valve housing 20, the spool 40, the spool one-way valve 87, the bias spring 56, a spring support 90, a retaining ring 84, and an inlet one-way valve assembly 88.

The solenoid assembly 12 includes an electrical connector 13, a coil 15, an armature 16, a first pole 17, and a push pin 18. The electrical connector 13 includes two terminals 14 configured to facilitate electronic communication with the ECU 99. The push pin 18 is rigidly mounted to the armature 16 so that the push pin 18 moves in unison with the armature 16. The HFCV 10 can be described as a pulse-width modulated proportional valve that is commonly used for phaser applications, such as that for a camshaft or a variable compression ratio cranktrain.

The valve housing 20 includes, in successive longitudinal order: a retaining ring end 31 (or an inlet end), a first land 68, a second land 69, a third land, 70, a fourth land 71, a fifth land 72, a radial lip 78, and an actuator end 32. The first and second lands 68, 69 form a first segment of the valve housing 20 that defines a first outer annulus 73; the second and third lands 69, 70 form a second segment that defines a second outer annulus 74; the third and fourth lands 70, 71 form a third segment that defines a third outer annulus 75; the fourth and fifth lands 71, 72 form a fourth segment that defines an o-ring groove 76 that receives an O-ring 80; and the fifth land 72 and the radial lip 78 form a fifth segment that defines a solenoid assembly groove 77 that receives the solenoid assembly 12 and the mounting plate 19. The valve housing 20 further includes: second fluid ports 24 arranged between the first and second lands 68, 69, within the first outer annulus 73; vent ports 21 arranged between the second and third lands 69, 70, within the second outer annulus 74; and first fluid ports 23 arranged between the third and fourth lands 70, 71 within the third outer annulus 75.

The valve housing 20 has a body 25 and a second pole 26 on the actuator end 32 that extends into a portion of the coil 15. A first bore 28 of the valve housing 20 extends through the body 25 such that it intersects and connects with the radially arranged first fluid ports 23, second fluid ports 24, and vent ports 21. A second bore 29, directly connected to the first bore 28, extends through the second pole 26. The push pin 18 moves longitudinally within the second bore 29 to actuate the spool 40.

The spool 40 of the HFCV 10 is biased towards the solenoid assembly 12 or an actuator end 11 of the HFCV 10 by an axial biasing force Fb of the bias spring 56. The pulse-width modulated solenoid assembly 12 can apply a force F1 on a push pin receiving land 47 arranged on the actuator end 48 of the spool 40 to overcome the biasing force Fb of the bias spring 56 to selectively move the spool 40 to a desired longitudinal position such as that shown in FIGS. 10B and 10C. Other forms of actuators or solenoid assemblies to move the spool 40 are also possible. A position of the spool 40 within the HFCV 10 is controlled by the ECU 99 which can control a duty cycle of the solenoid assembly 12.

The HFCV 10 could be arranged within the camshaft phaser 100; for example, the HFCV 10 could be configured as a central fastener that attaches the camshaft phaser 100 to the camshaft 150. The HFCV 10 could also be arranged at a remote location within the IC engine outside of the confines of the camshaft phaser 100. The embodiments and functional strategies described herein can also apply to other HFCV applications not described in this disclosure.

Referring to FIGS. 10A and 10C, with view to FIG. 3, different longitudinal positions of the spool 40 are shown in which pressurized hydraulic fluid is selectively delivered to either the first or second hydraulic actuation chambers 110A, 110B of the camshaft phaser 100 via: i) the first and second fluid galleries 112A, 112B arranged within the rotor 102; ii) the first and second fluid ports 23, 24 arranged on the valve housing 20; and, iii) inlet hydraulic fluid paths A, A4 of the HFCV 10.

Clockwise CW actuation of the rotor 102 relative the stator 104 requires pressurization of the first hydraulic actuation chambers 110A via the first hydraulic fluid gallery 112A and de-pressurization of the second hydraulic actuation chambers 110B via the second hydraulic fluid gallery 112B. Camshaft torques, sometimes referred to as "torsionals", act on the camshaft 150 in both clockwise and counterclockwise directions and are a result of valve train reaction forces that act on an opening flank and a closing flank of a camshaft lobe as it rotates. Assuming a clockwise rotating camshaft 150, an opening flank of a camshaft lobe can cause a counterclockwise CCW torque on the camshaft and camshaft phaser due to valve train reaction forces; furthermore, a closing flank of a camshaft lobe can cause a clockwise torque due to valve train reaction forces. In the case of a counterclockwise CCW torque, it is possible that this torque can overcome a force of a pressurized fluid F acting on a vane (or vanes) of the rotor 102 that is actuating the rotor 102 in a clockwise CW direction relative to the stator 104. In such an instance, hydraulic fluid F can be forced out of the first hydraulic actuation chambers 110A. The lobe of the camshaft 150 continues to rotate until it achieves its apex (peak lift) and then engagement of the closing flank of the lobe with the valve train causes a clockwise torque CW to act on the camshaft lobe. A counterclockwise torque CCW followed by a clockwise torque CW can induce a negative pressure in the first hydraulic actuation chambers 110A, requesting more hydraulic fluid to fill the first hydraulic actuation chambers 110A. This disclosure describes a recirculating HFCV in the following paragraphs, that can not only increase an HFCV's reactiveness to such torsionals and resultant negative pressures but can also reduce a camshaft phaser's pressurized hydraulic fluid consumption. This operating principle is achieved by routing some of the hydraulic fluid that is exiting one group of hydraulic actuation chambers to the other group of hydraulic actuation chambers for replenishment purposes.

The spool 40 includes, in successive longitudinal order: a spring end 41, a first land 42, a second land 43, a nose 44, and the push pin receiving land 47 at the actuator end 48. The first and second lands 42, 43 define an outer annulus 50. The spool 40 further includes through-holes 53 arranged between the first and second lands 42, 43 within the outer annulus 50, and a through-opening 45 arranged on the nose 44 of the spool 40. It could be stated that the through-holes 53 and the through-opening 45 are continuously fluidly connected to each other. That is, regardless of a position of the spool, a continuous fluid connection between the through-holes 53 and the through-opening 45 exists.

The spool 40 has a longitudinal bore 54 with an inner radial surface 55. The longitudinal bore 54 directly contacts hydraulic fluid and forms at least a portion of an inner fluid chamber 58. The longitudinal bore 54 and the first land 42 define an annular spring receiving land 59 for a first end of the bias spring 56. A second end of the bias spring 56 abuts with the spring support 90 which is axially supported within the valve housing 20 by the retaining ring 84. The retaining ring 84 is disposed within a groove 34 arranged at the retaining ring end 31 of the valve housing 20.

The spool 40 is disposed within the first bore 28 of the valve housing 20. The first and second lands 42, 43 of the spool 40 slidably engage the inner radial surface 33 of the first bore 28 of the valve housing 20 in a sealing manner such that an annular fluid cavity 51 is formed by the outer annulus 50 and the inner radial surface 33. The annular fluid cavity 51 could be described as having two fluid openings: the vent port 21 of the valve housing 20 and the through-hole 53 of the spool 40. The outer annulus 50 of the spool 40 is continuously fluidly connected to the vent ports 21 of the valve housing 20. That is, regardless of a position of the spool 40, a continuous fluid connection between the outer annulus 50 of the spool 40 and the vent ports 21 of the valve housing 20 exists. The nose 44 of the spool 40 forms an actuation end fluid cavity 46 with the first bore 28 of the valve housing 20 such that the through-opening 45 of the nose is continuously fluidly connected to the actuation end fluid cavity 46 in any position of the spool 40.

The spool 40 and its first and second lands 42, 43, outer annulus 50, nose 44, o-ring groove 76, solenoid assembly groove 77, through-holes 53, through-opening 45, and longitudinal bore 54 can be integrally formed from one piece.

The spool one-way valve 87 can be elastically disposed within an internal annular groove 38 arranged radially inwardly of the outer annulus 50 of the spool 40. The spool one-way valve 87 engages a radial outer surface 39 of the internal annular groove 38, however, other suitable installation configurations are possible. The spool one-way valve 87 is configured with axially extending tabs 95 that aid in axially locating it relative to the internal annular groove 38. The spool one-way valve 87 can be described as a compression one-way valve in that it opens radially inwardly toward a central axis 85 of the HFCV 10 when a pressure of a hydraulic fluid in the outer annulus 50 of the spool 40 is greater than a pressure of a hydraulic fluid within the inner fluid chamber 58. In such a pressure differential condition, the spool one-way valve 87 compresses or deflects radially inward to allow hydraulic fluid flow into the inner fluid chamber 58. Furthermore, the spool one-way valve 87 prevents flow out of the inner fluid chamber 58 when the pressure of the hydraulic fluid within the inner fluid chamber 58 exceeds the pressure of the hydraulic fluid within the outer annulus 50.

The inlet one-way valve assembly 88 is fixed on the retaining ring end 31 of the valve housing 20, forming an inlet fluid cavity 37 with the valve housing 20. The inlet one-way valve assembly 88 includes a ring-shaped body 92, and inlet filter 30, and an inlet one-way valve 89. The ring-shaped body 92 has a radially inwardly extending protrusion 49 that engages a groove 52 arranged on the retaining ring end 31 of the valve housing 20 to fix the inlet one-way valve assembly 88 to the valve housing 20. The inlet filter 30 is fixed to the inlet one-way valve 89 and the inlet one-way valve 89 is fixed to an inlet end the ring-shaped body 92.

The inner fluid chamber 58 of the HFCV 10 includes: i) the longitudinal bore 54 of the spool 40; ii) the internal annular groove 38 of the spool 40; iii) a spring well 82 formed between the spring end 41 of the spool 40 and the spring support 90; iv) a central opening 93 of the spring support 90; v) an inner opening of the retaining ring 84; and, vi) the inlet fluid cavity 37 formed between the inlet one-way valve 89 and the retaining ring 84. It could be stated that the inner fluid chamber 58 of the spool 40 has a radial outer wall 67 that includes the through-holes 53 and the through-opening 45.

The following discussion describes various hydraulic fluid paths and the respective fluid connections that are present within the HFCV 10 with the spool 40 in the three longitudinal positions shown in FIGS. 10A-10C. Each of the described hydraulic fluid paths are arranged in opposed pairs within the HFCV 10, as viewed within each of the cross-sectional views of FIGS. 10A-10C. Therefore, the pathways shown via sketched curves at the top of each respective figure also have symmetrical pathways at the bottom of each respective figure that are not sketched. Furthermore, the respective ports 21, 23, 24 and through-holes 53 of the valve housing 20 and spool 40 are symmetrically arranged so that they are also shown in opposed pairs within the cross-sectional views of FIGS. 10A-10C.

FIG. 10A shows an inlet hydraulic fluid path A, a return hydraulic fluid path B, and a venting hydraulic fluid path V of the HFCV 10 when the HFCV 10 is in a de-energized state and the spool 40 is in the extended position. In this extended position of the spool 40, the bias spring 56 applies a force Fb on the spool 40, such that the actuator end 48 of the spool 40 engages a base 27 of the second pole 26 of the valve housing 20.

Tracing the path of the inlet hydraulic fluid path A of FIG. 10A, hydraulic fluid flows from the hydraulic fluid pressure source 35, and axially through the inlet filter 30 and through the inlet one-way valve 89 of the inlet one-way valve assembly 88 in a first flow direction FD1. In order for this flow to occur, a hydraulic pressure of the hydraulic fluid delivered from the hydraulic fluid pressure source 35 needs to be greater than a pressure of the hydraulic fluid within the inlet fluid cavity 37 formed between the inlet one-way valve 89 and the retaining ring 84 such that the inlet one-way valve 89 opens towards the bias spring 56. Once through the inlet one-way valve 89, hydraulic fluid flows through the inlet fluid cavity 37 and axially enters the retaining ring end 31 of the bore 28 of the valve housing 20 in the first flow direction FD1. From the inlet fluid cavity 37, hydraulic fluid flows through an inner open area 86 of the retaining ring 84, through the spring well 82, through the first outer annulus 73, through the second fluid ports of the valve housing 20, and to the second hydraulic actuation chambers 110B.

Tracing the path of the return hydraulic fluid path B of FIG. 10A, hydraulic fluid flows from the first hydraulic actuation chambers 110A, through the third outer annulus 75 and first fluid ports 23 of the valve housing 20, and to the outer annulus 50 of the spool 40. Within the outer annulus 50, the return hydraulic fluid path B splits into two hydraulic fluid paths: a recirculating hydraulic fluid path R and a venting hydraulic fluid path V.

From the outer annulus 50 of the spool 40, the recirculating hydraulic fluid path R. continues through the through-holes 53 and spool one-way valve 87 of the spool 40, and into the inner fluid chamber 58. Once within the inner fluid chamber 58, hydraulic fluid flows within the inner fluid chamber 58 in a second flow direction FD2 past the spring end 41 of the spool 40, through the second fluid ports 24 and first outer annulus 73 of the valve housing 20, and to the second hydraulic actuation chambers 110A. It could be stated that the recirculation hydraulic fluid path R merges with the inlet hydraulic path A within the inner fluid chamber 58, or more specifically, within the spring well 82, forming a combined hydraulic fluid path A+R to the second hydraulic actuation chambers 110B.

From the outer annulus 50 of the spool 40, the venting hydraulic fluid path V continues through the vent ports 21 and the second outer annulus 74 of the valve housing 20. Hydraulic fluid that exits the second outer annulus 74 can be routed to a sump of the hydraulic fluid pressure source 35 such as an oil pump.

The recirculation hydraulic fluid path R facilitates efficient recycling of hydraulic fluid from the first hydraulic actuation chambers 110A to the second hydraulic actuation chambers 110B. The amount of hydraulic fluid that is delivered to the second hydraulic actuation chambers 110B from the first hydraulic actuation chambers 110A via the recirculation hydraulic fluid path R is dependent on need, or a pressure differential condition between outer annulus 50 of the spool 40 and the second fluid ports 24 of the valve housing 20. In order for positive hydraulic fluid flow to occur from the outer annulus 50 to the second fluid ports 24 (via the inner fluid chamber 58), a hydraulic fluid pressure P2 within the outer annulus 50 needs to be greater than a hydraulic fluid pressure P1 within the second fluid ports 24. Such a pressure differential condition defines a positive pressure differential. Furthermore, an amount of hydraulic fluid delivered from the first hydraulic actuation chambers 110A to the second hydraulic actuation chambers 110E in a first positive pressure differential condition ΔP1 is different than an amount of hydraulic fluid delivered from the first hydraulic actuation chambers 110A to the second hydraulic actuation chambers 110B in a second positive pressure differential condition ΔP2 that is different than the first positive pressure differential condition ΔP1. Correspondingly, an amount of hydraulic fluid delivered to the venting hydraulic fluid path V from the outer annulus 50 also depends on the pressure differential between the outer annulus 50 and the inner fluid chamber 58, and therefore varies accordingly. This relationship is shown in mathematical equation form below.

X=amount of hydraulic fluid exiting first hydraulic actuation chambers 110A and delivered to outer annulus 50 of spool 40 (path B)

Y=first fractional amount of X that is recirculated from first hydraulic actuation chambers 110A to the second hydraulic actuation chambers 110E (path R)

Z=second fractional amount of X that is exiting the HFCV 10 (path V)

ΔP=hydraulic fluid pressure of outer annulus 50 (P2)—hydraulic fluid pressure of second fluid ports 24 (P1)

$X = Y + Z$

For ΔP1=0.5 bar:

$X = Y1 + Z1$

For ΔP2=1 bar:

$X = Y2 + Z2$

Where: Y2>Y1 and Z2<Z1

The above positive pressure differential examples between the outer annulus 50 and the second fluid ports 24 illustrate how an amount of hydraulic fluid within the return hydraulic fluid path B is divided amongst the recirculation hydraulic fluid path R and the venting hydraulic fluid path V. In such positive pressure differential examples, an amount of fluid flow of the return hydraulic fluid path B can be divided into two fluid flow amounts, a first fractional fluid flow amount Y within the recirculation hydraulic fluid path R and a second fractional fluid flow amount Z within the venting hydraulic fluid path V. The first fractional fluid flow amount Y can vary from zero to X, an amount equal to that of the fluid flow amount within the return hydraulic fluid path B. The second fractional fluid flow amount Z can also vary from zero to X, an amount equal to that of the fluid flow amount with the return hydraulic fluid path B. Referencing the two ΔP examples above, for an increasing positive ΔP across the outer annulus 50 and the second fluid ports 24, the first fractional amount Y increases and the second fractional amount Z decreases. Furthermore, for a decreasing positive ΔP, the first fractional amount Y decreases and the second fractional amount Z increases. It could be stated that an amount of recirculated hydraulic fluid delivered to the second hydraulic actuation chambers 110B via recirculation hydraulic fluid path R varies according to need.

FIG. 10B shows a cross-sectional view of the HFCV 10 when the HFCV 10 is in the first energized state and the spool 40 is in the middle position. The middle position of the spool 40 is achieved when the pulse-width modulated solenoid assembly 12 applies a first force F1-A on the actuator end 48 of the spool 40 to overcome the biasing force Fb of the bias spring 56. In the middle position, three inlet hydraulic fluid paths A1, A2, A3 and two venting hydraulic fluid paths V1, V2 are present. As shown in FIG. 10B, a slight overlap occurs between: i) the actuation end fluid cavity 46 and the first fluid ports 23, and ii) the spring well 82 and the second fluid ports 24. These overlaps facilitate delivery of pressurized hydraulic fluid to each of the respective first and second hydraulic actuation chambers 110A, 110B. Thus, the middle position of the spool 40 can be used to maintain a phasing position of the camshaft phaser 100, or stated otherwise, maintain a constant rotational position of the rotor 102 relative to the stator 104.

Tracing the path of the inlet hydraulic fluid path A1 of FIG. 10B, hydraulic fluid flows from the hydraulic fluid pressure source 35, through the inlet filter 30 and the inlet one-way valve 89 of the inlet one-way valve assembly 88 in the first flow direction FD1. Once through the inlet one-way valve 89, hydraulic fluid flows through the inlet fluid cavity 37 and inner open area 86 of the retaining ring in the first flow direction FD1 until reaching the spring well 82. From the spring well 82, the inlet hydraulic fluid path A1 splits into inlet hydraulic fluid path A2 and inlet hydraulic fluid path A3. Inlet hydraulic fluid path A2 flows from the spring well 82 and through the second fluid ports 24 and first outer annulus 73 of the valve housing 20, and to the second hydraulic actuation chambers 110B. Inlet hydraulic fluid path A3 flows from the spring well 82 to the longitudinal bore 54 of the spool 40 in the first flow direction FD1, through the through-opening 45 of the spool 40, through the actuation end fluid cavity 46, through the first fluid ports 23 and third outer anulus 75 of the valve housing 20, and to the first hydraulic actuation chambers 110A.

With the spool 40 in the middle position, venting hydraulic fluid paths V1, V2 are active. Venting hydraulic fluid path V1 exits hydraulic fluid that results from leakage between the spool 40 and the valve housing 20 that flows to the outer annulus 50 of the spool 40; for example, leakage that occurs between the second land 43 of the spool 40 and the inner radial surface 33 of the first bore 28 of the valve housing 20 can flow to the outer annulus 50 and then exit the HFCV 10 through the vent ports 21 and second outer annulus 74 of the valve housing 20. Venting hydraulic fluid path V2 also exits hydraulic fluid that results from leakage between the spool 40 and the valve housing 20 that flows to the outer annulus 50 of the spool 40; for example, leakage that occurs between the first land 42 of the spool 40 and the inner radial surface 33 of the first bore 28 of the valve housing 20 can flow to the outer annulus 50 and then exit the HFCV 10 through the vent ports 21 and second outer annulus 74 of the valve housing 20.

The described middle position of the spool 40 and corresponding flows represents one of many design scenarios. In another example embodiment, no overlap between: i) the actuation end fluid cavity 46 and the first fluid ports 23 is present, and ii) the spring well 82 and the second fluid ports 24 is present; such a condition results in no flow of hydraulic fluid to the first and second hydraulic actuation chambers 110A, 110B.

FIG. 10C shows a cross-sectional view of the HFCV 10 when the HFCV 10 is in the second energized state and the spool 40 is selectively moved to the fully displaced position. In this fully displaced position of the spool 40, the pulse-width modulated solenoid assembly 12 applies a second force F1-B, on the actuator end 48 of the spool 40 to overcome the biasing force Fb of the bias spring 56. The second force F1-B is greater in magnitude than the previously described first force F1-A. The following discussion describes various hydraulic fluid paths and the respective fluid connections that are present with the spool 40 in this fully displaced position.

FIGS. 10C's cross-sectional view shows an inlet hydraulic fluid path A4 and a return hydraulic fluid path B1 of the HFCV 10. Each of these hydraulic fluid paths A4, B1 are arranged in opposed pairs within the HFCV 10, as viewed within the cross-sectional view of FIG. 10C.

Tracing the path of the inlet hydraulic fluid path A4 of FIG. 10C, hydraulic fluid flows from the hydraulic fluid pressure source 35, through the inlet filter 30 and the inlet one-way valve 89 of the inlet one-way valve assembly 88 in the first flow direction FD1. Once through the inlet one-way valve 89, hydraulic fluid flow continues through the inlet fluid cavity 37, through the inner open area 86 of the retaining ring 84, through the central opening 93 of the spring support 90, through the spring well 82, through the longitudinal bore 54 of the valve spool 40, through the through-opening 45 of the valve spool 40, through the actuation end fluid cavity 46, through the first fluid ports 23 and third outer annulus 75 of the valve housing 20, and to the first hydraulic actuation chambers 110A.

Tracing the path of the return hydraulic fluid path B1 of FIG. 10C, hydraulic fluid flows from the second hydraulic actuation chambers 110B, through the first outer annulus 73 and second fluid ports 24 of the valve housing 20, and to the outer annulus 50 of the spool 40; within the outer annulus 50, the return hydraulic fluid path B1 splits into two hydraulic fluid paths: a recirculation hydraulic fluid path R1 and a venting hydraulic fluid path V3.

The recirculation hydraulic fluid path R1 starts from the outer annulus 50 of the spool 40 and moves through the through-holes 53 of the spool 40, through the spool one-way valve 87 until reaching the longitudinal bore 54 or inner fluid chamber 58 of the spool 40; once the hydraulic fluid reaches the inner fluid chamber 58, it flows continuously without interruption in the first flow direction FD1 toward the actuator end 48 of the spool 40, through the through-opening 45 of the nose 44, through the actuation end fluid cavity 46, through the first fluid ports 23 and third outer annulus 75 of the valve housing 20, and to the first hydraulic actuation chambers 110A. It could be stated that the recirculation hydraulic fluid path R1 merges with the inlet hydraulic fluid path A4 within the longitudinal bore 54 or inner fluid chamber 58 of the spool 40, forming a combined hydraulic fluid path A4+R1 to the first actuation chambers 110A.

The recirculation hydraulic fluid path R1 facilitates efficient recycling of hydraulic fluid from the second hydraulic actuation chambers 110B to the first hydraulic actuation chambers 110A. The amount of hydraulic fluid that is delivered to the first hydraulic actuation chambers 110A from the second hydraulic actuation chambers 110B via the recirculation hydraulic fluid path R1 is dependent on need, or, on a pressure differential between the outer annulus 50 of the spool 40 and the first fluid ports 23 of the valve housing 20. In an example embodiment, for flow to occur within the recirculation hydraulic fluid path R1 from the outer annulus 50 to the first fluid ports 23 (via the inner fluid chamber 58 and actuation end fluid cavity 46), a hydraulic fluid pressure P2' of the outer annulus 50 is greater than a hydraulic pressure P1' of the first fluid ports 23. Furthermore, an amount of hydraulic fluid delivered from the second hydraulic actuation chambers 110B to the first hydraulic actuation chambers 110A in a first positive pressure differential condition $\Delta P1'$ is different than an amount of hydraulic fluid delivered from the second hydraulic actuation chambers 110B to the first hydraulic actuation chambers 110A in a second positive pressure differential condition $\Delta P2'$ that is different than the first positive pressure differential condition $\Delta P1'$. Correspondingly, an amount of hydraulic fluid delivered to the venting hydraulic fluid path V3 from the outer annulus 50 also depends on the pressure differential between the outer annulus 50 and the first fluid ports 23, and therefore varies accordingly. This relationship is shown in mathematical equation form below.

X'=amount of hydraulic fluid exiting second hydraulic actuation chambers 110B and delivered to outer annulus 50 of spool 40 (path B1)

Y'=first fractional amount of X' that is recirculated from second hydraulic actuation chambers 110B to the first hydraulic actuation chambers 110A (path R1)

Z'=second fractional amount of X' that is exiting the HFCV 10 (path V3)

$\Delta P'$=hydraulic fluid pressure of outer annulus 50 (P2')—hydraulic fluid pressure of first fluid ports (P1')

$$X' = Y' + Z'$$

For $\Delta P1' = 0.5$ bar:

$$X' = Y1' + Z1'$$

For $\Delta P2' = 1$ bar:

$$X' = Y2' + Z2'$$

Where: Y2'>Y1' and Z2'<Z1'

The above positive pressure differential examples between the outer annulus 50 of the spool 40 and the first fluid ports 23 of the valve housing 20 illustrate how an amount of hydraulic fluid within the return hydraulic fluid path B1 is divided amongst the recirculation hydraulic fluid path R1 and the venting hydraulic fluid path V3. In such positive pressure differential examples, an amount of fluid flow of the return hydraulic fluid path B1 can be divided into two fluid flow amounts, a first fractional fluid flow amount Y' within the recirculation hydraulic fluid path R1 and a second fractional fluid flow amount Z' within the venting hydraulic fluid path V3. The first fractional fluid flow amount Y' can vary from zero to X', an amount equal to that of the fluid flow within the return hydraulic fluid path B1. The second fractional fluid flow amount Z' can also vary from zero to X', an amount equal to that of the fluid flow within the return hydraulic fluid path B1. Referencing the two ΔP examples above, for an increasing positive ΔP across the outer annulus 50 and the first fluid ports 23, the first fractional amount Y' increases and the second fractional amount Z' decreases. Furthermore, for a decreasing positive ΔP, the first fractional amount Y' decreases and the second fractional amount Z' increases. It could be stated that an amount of recirculated hydraulic fluid delivered to the first hydraulic actuation chambers 110A via recirculation hydraulic fluid path R1 varies according to need.

The venting hydraulic fluid path V3 starts from the outer annulus 50 of the spool 40 and moves through the vent ports 21 and second outer annulus 74 of the valve housing 20. Hydraulic fluid that exits the second outer annulus 74 can be routed to a sump of the hydraulic fluid pressure source 35 such as an oil pump.

For the discussion of this disclosure, two adjacent fluid galleries or fluid cavities that are connected to each other via a one-way valve are "fluidly connected" but not "continuously fluidly connected", as there are defined fluid pressure conditions that do not yield a flow of fluid from one hydraulic fluid gallery to the other. For example, the outer annulus 50 of the spool 40 is continuously connected to the vent ports 21 of the valve housing 20; however, the outer annulus 50 is not continuously fluidly connected to the first fluid ports 23, as supported by FIG. 10C, which shows that these two entities are separated via the spool one-way valve 87, and, thus, fall under the "fluidly connected" definition. As a further example, the through-holes 53 of the spool are fluidly connected to the inner fluid chamber 58, but not continuously fluidly connected due to the presence of the spool one-way valve 87.

The sizes and/or diameter of the vent ports 21 of the valve housing 20 that are utilized by the venting hydraulic fluid paths V, V3 of FIGS. 10A and 10C can be adjusted to tune the amount of recirculation that occurs within the HFCV 10. This amount could be dependent upon the magnitude of the camshaft torsionals acting on the camshaft phaser; for example, higher camshaft torsionals may require a smaller sized vent through-aperture. Furthermore, in some applications the vent ports 21 could be eliminated from the valve housing 20.

The flow paths shown in the figures are symmetrically arranged such that a transverse cutting plane that intersects the central axis 85 of the HFCV 10 and one of the flow paths also intersects a second instance of the same flow path. Other arrangements of flow paths are also possible, including non-symmetrical arrangements.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hydraulic fluid control valve, comprising:
   a valve housing having:
      a first fluid port configured to be fluidly connected to a first hydraulic actuation chamber;
      a second fluid port configured to be fluidly connected to a second hydraulic actuation chamber, the first and second hydraulic actuation chambers configured to receive and exit hydraulic fluid; and
      a vent port arranged between the first fluid port and the second fluid port in a longitudinal direction of the valve housing; and
   a spool disposed within a longitudinal bore of the valve housing, the spool having:
      an outer annulus;
      a through-hole arranged within the outer annulus;
      an inner fluid chamber; and
      a one-way valve arranged within the inner fluid chamber, the one-way valve fluidly connecting the through-hole to the inner fluid chamber; and
   in a first axial position of the spool:
      the outer annulus is configured to:
         receive hydraulic fluid from the first hydraulic actuation chamber;
         deliver at least a portion of the hydraulic fluid from the first hydraulic actuation chamber to the second hydraulic actuation chamber via the through-hole, the one-way valve, and the inner fluid chamber; and,
   in a second axial position of the spool:
      the outer annulus is configured to:
         receive hydraulic fluid from the second hydraulic actuation chamber; and
         deliver at least a portion of the hydraulic fluid from the second hydraulic actuation chamber to the first hydraulic actuation chamber via the through-hole, the one-way valve, and the inner fluid chamber.

2. The hydraulic fluid control valve of claim 1, wherein the one-way valve opens in a radially inward direction.

3. The hydraulic fluid control valve of claim 1, wherein the valve housing is configured to receive inlet hydraulic fluid from a hydraulic fluid pressure source, the inlet hydraulic fluid axially entering an end of the longitudinal bore.

4. The hydraulic fluid control valve of claim 1, further comprising:
   a bias spring configured to apply an axial biasing force to the spool; and
   a spring well formed between the spool and the valve housing, the bias spring disposed within the spring well; and
   in the first axial position of the spool, the spring well is configured to:
      receive the at least a portion of the hydraulic fluid from the first hydraulic actuation chamber;
      receive inlet hydraulic fluid from a hydraulic fluid pressure source; and
      deliver the at least a portion of the hydraulic fluid from the first hydraulic actuation chamber and the inlet hydraulic fluid to the second hydraulic actuation chamber.

5. The hydraulic fluid control valve of claim 1, wherein:
in the first axial position of the spool, the outer annulus is configured to deliver a remaining portion of the hydraulic fluid from the first hydraulic actuation chamber to the vent port; and
in the second axial position of the spool, the outer annulus is configured to deliver a remaining portion of the hydraulic fluid from the second hydraulic actuation chamber to the vent port.

6. The hydraulic fluid control valve of claim 5, wherein the outer annulus and the longitudinal bore of the valve housing form an annular fluid cavity, and the annular fluid cavity is configured with the vent port and the through-hole.

7. A hydraulic fluid control valve, comprising:
a valve housing having:
a first fluid port configured to be fluidly connected to a first hydraulic actuation chamber;
a second fluid port configured to be fluidly connected to a second hydraulic actuation chamber, the first and second hydraulic actuation chambers configured to receive and exit hydraulic fluid; and
a spool disposed within a longitudinal bore of the valve housing; and
a bias spring configured to apply an axial biasing force to move the spool within the longitudinal bore;
a spring well formed between the spool and the valve housing, the bias spring disposed within the spring well; and,
the spring well configured to:
receive recirculating hydraulic fluid from the first hydraulic actuation chamber and inlet hydraulic fluid from a hydraulic fluid pressure source; and
deliver the recirculating hydraulic fluid and the inlet hydraulic fluid to the second hydraulic actuation chamber.

8. The hydraulic fluid control valve of claim 7, wherein the spring well is configured to receive the inlet hydraulic fluid from an inlet end of the valve housing, such that the inlet hydraulic fluid axially enters an end of the longitudinal bore and moves axially from the inlet end to the spring well.

9. The hydraulic fluid control valve of claim 7, wherein a first end of the spring well is configured to receive the recirculating hydraulic fluid moving in a first axial direction and a second end of the spring well is configured to receive the inlet hydraulic fluid moving in a second axial direction.

10. The hydraulic fluid control valve of claim 7, wherein the spool further comprises:
an outer annulus;
a through-hole arranged in the outer annulus; and
a one-way valve arranged radially inwardly of the through-hole; and
the valve housing and spool define a recirculation hydraulic fluid path extending through the through-hole, through the one-way valve, and to the spring well.

11. The hydraulic fluid control valve of claim 10, wherein the one-way valve opens in a radially inward direction.

12. A hydraulic fluid control valve, comprising:
a valve housing having:
a first radial fluid port configured to be fluidly connected to a first hydraulic actuation chamber;
a second radial fluid port configured to be fluidly connected to a second hydraulic actuation chamber; and,
a spool disposed within a longitudinal bore of the valve housing, the spool having:
an outer annulus;
a through-hole arranged within the outer annulus;
an inner fluid chamber; and
a one-way valve arranged within the inner fluid chamber; and
a bias spring configured to apply a biasing force to move the spool within the longitudinal bore of the valve housing, the bias spring arranged within a spring well formed between the spool and the valve housing; and
in a first axial position of the spool, the valve housing and spool define:
a first inlet hydraulic fluid path extending from a first end of the longitudinal bore of the valve housing to the spring well; and the first inlet hydraulic fluid path configured to provide hydraulic fluid to the second hydraulic actuation chamber via the second radial fluid port of the valve housing; and
a first recirculation hydraulic fluid path extending:
from the outer annulus;
through the through-hole;
through the one-way valve;
through a first portion of the inner fluid chamber; and
to the spring well; and
the first recirculation hydraulic fluid path is configured to provide hydraulic fluid from the first hydraulic actuation chamber to the second hydraulic actuation chamber via the second radial fluid port of the valve housing.

13. The hydraulic fluid control valve of claim 12, wherein the first inlet hydraulic fluid path extends axially in a first flow direction from the first end of the longitudinal bore to the spring well, and the first recirculation hydraulic fluid path extends axially in a second flow direction through the first portion of the inner fluid chamber to the spring well.

14. The hydraulic fluid control valve of claim 12, wherein the one-way valve opens in a radially inward direction.

15. The hydraulic fluid control valve of claim 12, wherein in the first axial position of the spool, the valve housing and spool further define a first return hydraulic fluid path configured to: i) return hydraulic fluid from the first hydraulic actuation chamber to the outer annulus, and ii) split into two hydraulic fluid paths including the first recirculation hydraulic fluid path and a first venting hydraulic fluid path.

16. The hydraulic fluid control valve of claim 15, wherein the first venting hydraulic fluid path extends to a vent port arranged on the valve housing.

17. The hydraulic fluid control valve of claim 16, wherein the outer annulus and the longitudinal bore of the valve housing form an annular fluid cavity, the annular fluid cavity configured with the vent port and the through-hole.

18. The hydraulic fluid control valve of claim 12, wherein in a second axial position of the spool, the valve housing and spool define:
a second inlet hydraulic fluid path extending from the first end of the longitudinal bore of the valve housing and to a through-opening arranged at an actuator end of the spool; and the second inlet hydraulic fluid path configured to provide hydraulic fluid to the first hydraulic actuation chamber via the first radial fluid port of the valve housing; and
a second recirculation hydraulic fluid path extending:
from the outer annulus;
through the through-hole;
through the one-way valve;
through a second portion of the inner fluid chamber; and
to the through-opening arranged at the actuator end of the spool; and the second recirculation hydraulic fluid path is configured to provide hydraulic fluid from the second hydraulic actuation chamber to the first hydraulic actuation chamber via the first radial fluid port of the valve housing.

19. The hydraulic fluid control valve of claim 18, wherein in the second axial position of the spool, the valve housing and spool further define a second return hydraulic fluid path configured to: i) return hydraulic fluid from the second hydraulic actuation chamber to the outer annulus, and ii) split into two hydraulic fluid paths including the second recirculation hydraulic fluid path and a second venting hydraulic fluid path.

* * * * *